3,164,993
INSTRUMENT FOR MEASURING A PHYSICAL CONDITION
Thomas R. Schmidt, Lafayette, Calif., assignor to Shell Oil Company, New York, N.Y., a corporation of Delaware
Filed Aug. 17, 1960, Ser. No. 50,128
6 Claims. (Cl. 73—362)

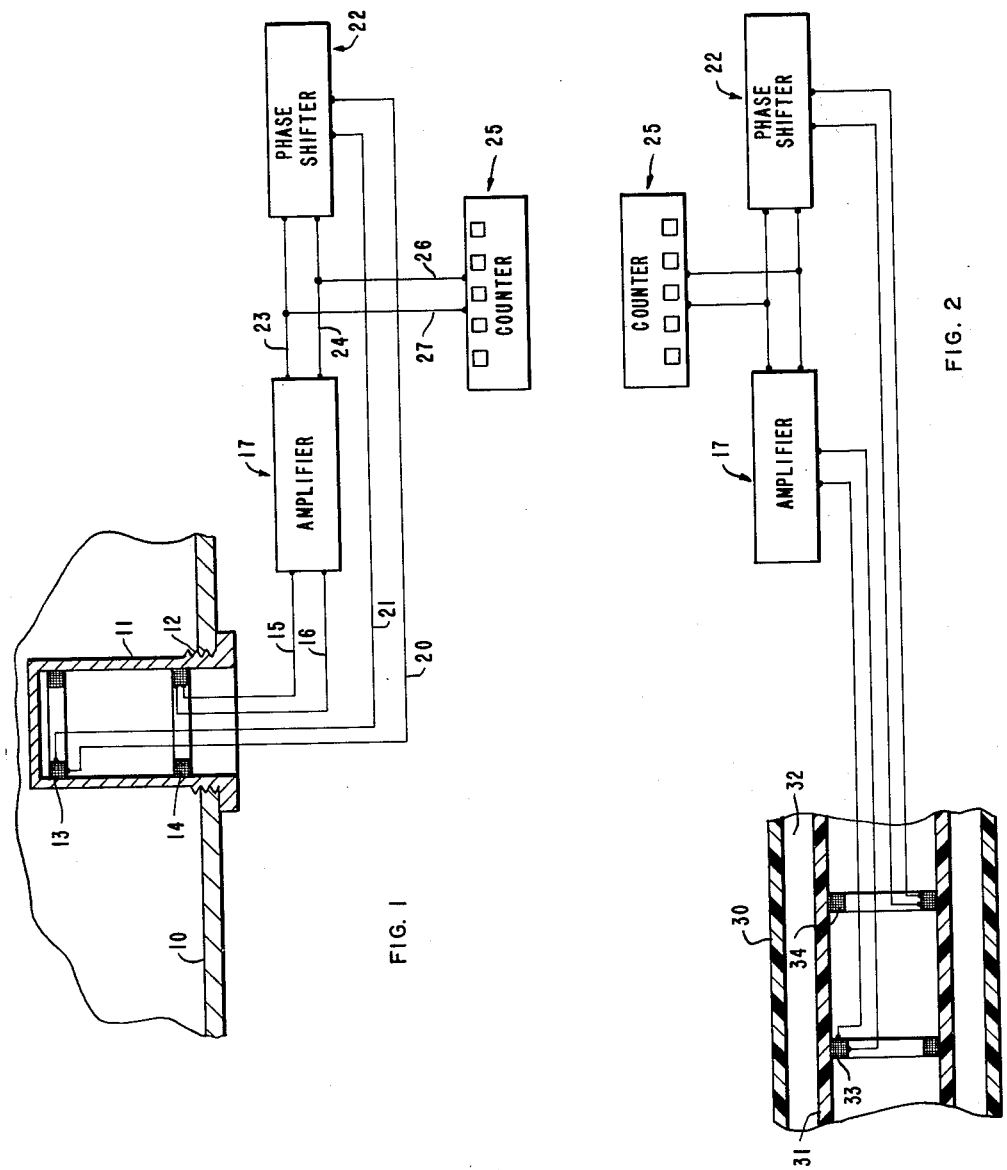

This invention pertains to instruments and more particularly to instruments which utilize the eddy current phenomena to measure a physical condition.

It is well known that the eddy current phenomena occurs whenever an alternating magnetic field such as the field that surrounds a coil coupled to an alternating current power supply passes through a material. The circulation of eddy currents in a material are affected by the permeability, thickness and resistivity of the material through which they pass as well as the frequency of the applied alternating current. This invention utilizes these effects on the circulation of eddy currents by the material to measure a physical condition of the material or its surrounding medium. Such physical conditions may be for example, the temperature of the material, its conductivity, or some other physical condition.

In the past, most of these physical conditions have been measured or detected by various types of instruments, for example, Bourdon tubes have been used for detecting changes in pressure, while thermometers have been used for detecting temperature changes. While these various means give acceptable results, they have many disadvantages, such as slowness of response of the detecting instruments to changes in the magnitude of the physical condition, as well as the accuracy of the measurement of the physical condition.

Accordingly, it is the principal object of this invention to provide an instrument means utilizing an eddy current phenomena to measure the change in a physical condition.

A further object of this invention is to provide a novel instrument utilizing the eddy current phenomena to measure the change in a physical condition of a material and having a digital form of output.

A further object of this invention is to provide a novel instrument for measuring a physical condition in which two coaxial coils are spaced apart a distance greater than the diameter of the largest coil with one of the coils being coupled to a source of alternating current and the second coil being coupled to a circuit means for measuring the change in an electrical characteristic of the second coil caused by a change in the eddy current flow in the material surrounding the coils.

A still further object is to provide a novel thermometer utilizing the change in the eddy current circulation in the material surrounding the thermometer to detect changes in the temperature of the material.

A still further object of the present invention is to provide a novel conductivity measuring device which utilizes the change in the eddy current flow in the material surrounding the device to detect changes in the conductivity of the material.

The above objects of this invention are achieved by utilizing two coaxial coils which are spaced apart a distance greater than the diameter of the largest coil. Both coils are preferably the same diameter and have the same coil factors, although coils of different diameter having different coil factors could also be used. The coils are disposed adjacent to a tubular member with the tubular member being responsive to the physical condition being measured. The tubular member may be formed of a single material or a composite material depending upon the particular physical condition to be measured as well as the environment in which the device is to operate. The flow of eddy currents in the tubular member in addition should be responsive to changes in the physical condition being measured. One of the coils is coupled to a source of alternating current to induce eddy currents in the tubular member surrounding the coil, while the other coil is coupled to a circuit for measuring the change in an electrical characteristic of the coil caused by the change in the flow of eddy currents. A preferable arrangement is to couple one of the coils to the output of an amplifier and the other coil to the input of the amplifier and adjust the phase shift of the amplifier to cause the circuit including the coils to oscillate. Under these conditions the frequency of oscillation will be related to a change in the physical condition being measured if other variables in the system are maintained constant.

The above objects and advantages of this invention will be more easily understood from the following description when taken in conjunction with the attached drawing in which:

FIGURE 1 shows this invention as applied to a thermometer; and,

FIGURE 2 illustrates the invention as applied to a conductivity measuring instrument.

As explained above, the basic instrument consists of two coaxial coils disposed adjacent to a tubular element with the tubular element being responsive to the physical condition being measured. One of the coils is coupled to an alternating current power supply while the other coil is used as a pick up coil to detect changes in the eddy current or magnetic flux in the tubular member caused by changes in the condition being measured. Frequency, amplitude, phase shift, or other electrical characteristics of the signal induced in the pick up coil may be used to detect and measure changes in the physical condition.

When the above instrument is operated the phase lag of the voltage induced in the pick up coil with respect to the alternating current applied to the first coil will be given by the following expression:

$$\phi = 2\pi d \sqrt{\frac{f\mu}{\rho \times 10^3}} \quad (1)$$

wherein:
$\phi$ = phase lag in radians
$d$ = wall thickness in cm.
$f$ = frequency in cycles per second
$\mu$ = relative permeability
$\rho$ = resistivity in micro ohm cm.

The natural frequency of a two-coil, amplifier combination will always adjust so that the phase lag between the coils plus the phase shift in the amplifier adds to 360 electrical degrees. Thus, ($\phi$) the phase lag in the expression will remain constant if first the phase shift in the amplifier is constant, and, second, any variation in ($\rho$) the resistivity of the metal is compensated for by a shift in frequency ($f$) of the oscillator. Then $f$ is given by:

$$f = \left(\frac{\phi}{2\pi d}\right)^2 \frac{10^3}{\mu} \rho \quad (2)$$

and it can be seen if $f$ and $\rho$ are the only variables, $f$ is proportional to $\rho$.

Now $\rho$ as a function of temperature is given by:

$$\rho = \rho_{20} 1 + \alpha(T - T_{20}) \quad (3)$$

$\rho$ = resistivity at any temperature T
$\rho_{20}$ = resistivity at 20° C.
$\alpha$ = temperature coefficient of resistivity
$T$ = temperature in ° C.
$T_{20}$ = 20° C.

Substituting (3) into (2) gives:

$$f = \frac{\rho_{20}}{\mu}\left(\frac{\phi}{2\pi d}\right)^2 10^3 \alpha T + \frac{\rho_{20}}{\mu}\left(\frac{\phi}{2\pi d}\right)^2 10^3 (1-\alpha T_{20}) \quad (4)$$

or $$f = C\alpha T + C(1-\alpha T_{20}) \quad (5)$$

where $$c = \frac{\rho_{20}}{\mu}\left(\frac{\phi}{2\pi d}\right)^2 10^3$$

This is the slope intercept form of a straight line where the slope is given by $C\alpha$ and the Y intercept by $$C(1-\alpha T_{20})$$

Referring now to FIGURE 1, there is shown an embodiment of this invention utilizing the above theory to measure temperature. Shown is a tubular member or pipe 10 in which the medium whose temperature is desired is flowing or contained. Disposed in the interior of the tubular member 10 is a closed end tubular member 11. The closed end tubular member 11 may be fastened to an opening in the wall of the tubular member 10 by any desired means such as by a threaded joint 12. While the embodiment of FIGURE 1 is illustrated as having the tubular member 11 projecting into a flowing stream of material whose temperature is desired, other arrangements are obviously possible. For example, if the temperature of a solid is desired, one would only have to embed the tubular member 11 in the solid or dispose it in close proximity thereto. The only requirement of the instrument of this invention is that the tubular member 11 be responsive to the changes in the physical condition being measured. The embodiment in FIGURE 1 thus requires that the temperature of the tubular member 11 change in response to any change in the temperature of the medium.

The tubular member 11 may be formed of any desired material but is preferably formed of a material having relatively low permeability and low resistivity such as aluminum, copper, brass or the like. The use of a material having these characteristics will insure that the eddy current flow in the tubular member 11 will change in response to changes in the physical condition being measured. This means for the embodiment shown in FIGURE 1 that the resistivity of the tubular member 11 will change as its temperature changes. The changes in the resistivity of the tubular member will, of course, cause a related change in the eddy current flow. Furthermore, while the tubular member 11 is shown as formed of a single material it could be formed of a composite material, for example, it may have a thin outer shell and a ceramic or heat-insulating inner shell to insulate the coils described below from the environment surrounding the outer surface of the tubular member. Also, in many cases it may be desirable to use a different outer material in order to provide sufficient mechanical strength to withstand the environment in which the instrument is disposed. The only requirement with regard to the tubular member 11 is that the magnetic field induced by the coil coupled to the alternating current source penetrate the walls of the tubular member in order to establish eddy currents therein.

Disposed within the tubular member 11 are two coaxial coils 13 and 14. As explained above, while it is not necessary that the coils 13 and 14 be of identical size and coil factors, although they preferably are of substantially the same physical size and the same coil factors. By utilizing substantially similar coils, the remainder of the circuitry is greatly simplified and operation of the instrument improved. Furthermore, the two coils 13 and 14 are disposed with their axes parallel with the axis of the tubular member 11 and are spaced from each other a distance greater than the overall diameter of the tubular member. The exact spacing of the two coils is not critical provided they are spaced at least one diameter apart since a spacing of this order will substantially eliminate any direct coupling between the two coils.

The coil 14 which is known as the pick up coil is coupled by means of leads 15 and 16 at the input side of a power amplifier 17. The power amplifier 17 may be any well known design of power amplifier having substantially a zero phase shift with changes in the frequency of the applied input signal. The coil 13 which is known as the exciting coil is coupled by means of leads 20 and 21 to the output side of a phase shifting circuit 22. The phase shifting circuit 22 should be an adjustable circuit in order that the phase shift applied to the input signal can be adjusted to any desirable value. While a phase shifting circuit is shown in the embodiment of FIGURE 1, it is not absolutely necessary since by proper design the required phase shift may be easily accomplished within the amplifier 17. The output signal of the amplifier 17 is coupled to the input side of the phase shifting circuit 22 by means of leads 23 and 24.

As explained above, when the above circuit is operated it will oscillate at a frequency which is dependent solely upon the resistivity of the tubular member 11. The resistivity of the tubular member 11 is, of course, related to the temperature of the material surrounding its outer surface. Thus, it is seen that the frequency of oscillation of the above circuit is related to the temperature whose magnitude is to be determined. Thus, it is a simple matter to measure the frequency of oscillation by means of a digital counter 25 which is coupled to the output of the amplifier 17 by leads 26 and 27. By proper design of the various circuit parameters one can obtain a circuit whose frequency varies directly with temperature. Under these conditions the reading on the digital counter 25 can be made exactly equal to the magnitude of the temperature.

In order to construct a practical instrument, one can assume the following parameters: suppose the counter 25 reads 20,000 at 0° C. and 20,371 at 37.1° C. If the 10,000 window of the counter were masked off, the instrument would then read the temperature directly. The only thing remaining is to find a combination of variables such that at zero degrees centigrade the circuit oscillates at 20,000 cycles per second and increases at the rate of 10 cycles per second per degree centigrade. Utilizing the above described formulae it is seen that the following two equations exist:

Since at $T=0$ $$f = 20{,}000$$

we know from (5) that $$1 - \alpha T_{20} = \frac{20{,}000}{C}$$

and also from (5) that $$C\alpha = 10$$

An $\alpha$ of .000495/° C. and a C of 20,200 satisfy these equations. Certain bronzes have an $\alpha$ close to the above value and C could be satisfied by the following conditions:

Assume a bronze:

$$\rho = 15 \quad \mu = 1 \quad d = 0.5 \text{ cm.}$$

$$\phi = 2\pi d \sqrt{\frac{C\mu}{\rho 10^3}} = 3.64 \text{ rad or } 209°$$

Thus, if the amplifier supplies 151 electrical degrees of phase lag the instrument will oscillate as desired. Accordingly, one may construct an instrument in which the counter 25 will read directly the temperature being measured utilizing a bronze to form the tubular member 11.

While the above example assumed values and then selected a material to meet these particular values it is at times easier to select a material from which the tube 11 would be fabricated in order to meet the requirements of strength, corrosion resistance and other environmental conditions and then adjust the zero position and span of the counter 25 to give a useful reading. The zero position, of course, can be easily adjusted by varying the phase lag of the amplifier while the span may be adjusted by making the external phase shifting network frequency sensitive to a selected degree. The design of a phase shifting network which is frequency-sensitive is not difficult in that the frequency deviations over the normal temperature range will usually be less than 5% and many phase shifting networks are available whose slope or phase shift with response to frequency are of the proper shape over this limited range.

Referring now to FIGURE 2, there is shown an embodiment of this invention adapted to measure the conductivity of a material. In this embodiment, the tubular member is formed from two coaxial tubular members 30 and 31 with the annular space between them being filled by the material whose conductivity is desired. The members 30 and 31 should be formed of a material having an extremely high resistivity and relatively low permeability, for example, a glass or ceramic material. Thus, the material filling the space between the tubular members and whose conductivity is desired will form the effective tubular member of the instrument. The composite tubular member consisting of the two members 30 and 31 plus the material filling the annular space 32 will have characteristics substantially the same as those specified for the tubular member 11 of FIGURE 1. The material filling the space 32 may be a continuous flow or in a static condition if desired. The two coils 33 and 34 are disposed in the interior of the tubular member 31 and are spaced apart a distance greater than the diameter of the tubular member 30. The coil 33 is connected to the input side of the amplifier 17 while the coil 34 is connected to the output side of the phase shifting network 34. Of course in the case of a solid material whose conductivity is desired it would not be necessary to dispose the material in the annular space between two tubular members but only have it surround the two coils.

When this embodiment of the invention is operated changes in the conductivity of the material filling the annular space 32 will be reflected by a change in the frequency of oscillation of the circuit. This is similar to the operation of the embodiment shown in FIGURE 1 since the change in conductivity is substantially the opposite of the change in resistivity of the tubular member 11. As explained above, a change in the temperature of the tubular member 11 causes a change in its resistivity which effects the eddy current flow. Thus, the frequency oscillation of the circuit of FIGURE 2 will be related to the conductivity of the material. In the same manner as described above for FIGURE 1, by proper choice of various circuit parameters one can develop an instrument which will read directly in the desired conductivity units.

While but two embodiments of this invention are described in detail, many modifications and changes will occur to those skilled in the art. For example, while the coils in the embodiments were described as being coupled to an oscillating circuit, one only needs to couple the exciting coil to a source of alternating current and then measure an electrical characteristic, such as phase, amplitude or frequency of the electrical signal induced in the pick up coil. Also, the instrument of this invention could be adapted to measure other physical conditions than temperature and conductivity as explained above. For example, in order to measure pressure, one could utilize a tapered tubular member disposed around the two coils and then axially positioning the tapered tubular member with respect to the coils in response to the pressure being measured. This would in effect vary the eddy current flow in the tubular member in response to pressure changes.

Accordingly, this invention should not be limited to the particular details described but only to its broad spirit and scope.

I claim as my invention:

1. A thermometer comprising: a metallic tubular member closed at one end; an exciting coil disposed within said member; a pick up coil disposed within said member and spaced from the exciting coil; said exciting coil being coupled to the output side of an amplifier and said pick up coil being coupled to the input side of the amplifier whereby the frequency of oscillation of the amplifier will be related to the temperature of the member.

2. A thermometer comprising: a metallic tubular member closed at one end; an exciting coil and pick up coil disposed within the tubular member, said exciting coil being spaced from said pick up coil a distance sufficient to insure that the magnetic flux sensed by the pick up coil has penetrated the walls of the tubular member; said exciting coil being coupled to the output side of an amplifier and said pick up coil being coupled to the input side of said amplifier whereby the frequency of oscillation of said amplifier will be related to the temperature of the member.

3. A thermometer comprising: a metallic tubular member closed at one end, said member being disposed with its outer surface in contact with the medium whose temperature is desired; an exciting coil disposed within said tubular member, a pick up coil disposed within said tubular member and spaced from said exciting coil a distance at least equal to the diameter of the tubular member; said pick up coil being coupled to the input side of a phase shifting device and said exciting coil being coupled to the output side of said phase shifting means whereby said phase shifting means will oscillate at a frequency related to the temperature of said tubular member.

4. A device for measuring a physical condition comprising: an exciting coil and a pick up coil; a metallic tubular member disposed to surround said coils, said coils being spaced a distance at least equal to the diameter of the tubular member; means responsive to said physical condition for changing the electrical properties of said tubular member; said exciting coil being coupled to a source of alternating current power and means for measuring an electrical characteristic of the response of the pick up coil to the changes in the electrical properties of the tubular member caused by said physical condition.

5. A conductivity measuring apparatus comprising: a tubular member formed of a material having a high dielectric constant; an exciting coil and a pick up coil disposed adjacent one surface of said tubular member; said coils being coaxially mounted and spaced from each other a distance at least equal to the diameter of the tubular member; means for disposing the material whose conductivity is to be measured adjacent the other surface of the tubular member; said exciting coil being coupled to a source of alternating current and means for measuring an electrical characteristic of the response of the pick up coil to the changes in the conductivity of the material.

6. An apparatus for measuring the magnitude of a physical condition comprising: a pair of spaced coils, said coils being disposed coaxially and spaced a distance that exceeds the diameter of the largest coil; first means responsive to the physical condition disposed in the electrical magnetic field between said coils; one of said coils being coupled to a source of alternating current; and circuit means for measuring an electrical characteristic of the response of the other coil to the changes in the first means caused by changes in the physical condition.

(References on following page)

References Cited by the Examiner

UNITED STATES PATENTS

| | | | |
|---|---|---|---|
| Re. 24,420 | 1/58 | Fielden | 324—40 X |
| 1,697,148 | 1/29 | Spooner | 324—73 |
| 1,869,336 | 7/32 | De Forest | 324—40 |
| 1,990,085 | 2/35 | Mudge et al. | 73—362 |
| 2,054,120 | 9/36 | De Florez | 73—359 |
| 2,277,037 | 3/42 | Clark | 331—135 |
| 2,350,329 | 6/44 | Hornfeck | 73—362 |
| 2,600,396 | 6/52 | Ewen | 73—362 |
| 2,935,874 | 5/60 | Morgan | 73—362 |
| 2,989,691 | 6/61 | Cook | 324—24 |

FOREIGN PATENTS 598,176  2/48  Great Britain.

ISAAC LISANN, *Primary Examiner.*